United States Patent
Vetter

[11] 3,682,533
[45] Aug. 8, 1972

[54] FOCUSING ANAMORPHIC OPTICAL SYSTEM

[72] Inventor: Richard H. Vetter, Pacific Palisades, Calif.

[73] Assignee: United Artists Theatre Circuit, Inc., San Francisco, Calif.

[22] Filed: Jan. 22, 1971

[21] Appl. No.: 109,063

Related U.S. Application Data

[63] Continuation of Ser. No. 798,924, Feb. 13, 1969, abandoned.

[52] U.S. Cl. .................................350/181, 350/184
[51] Int. Cl. ..........................................G02b 13/12
[58] Field of Search.......................................350/181

[56] References Cited
UNITED STATES PATENTS

| | | |
|---|---|---|
| 2,179,850 | 11/1939 | Glancy....................350/181 X |
| 3,041,935 | 7/1962 | Jacobsen.....................350/181 |

*Primary Examiner*—John K. Corbin
*Attorney*—D. Gordon Angus et al.

[57] ABSTRACT

An optical system for photography and projection in which an anamorphosing system can be focused without astigmatism and without change in lateral compression ratio from infinity to close-ups. The system includes a master focusing lens, an anamorphosing lens of at least two sections, and an axially movable anamorphic focusing lens between the sections. The compression ratio of the anamorphosing lens and of the anamorphic focusing lens are substantially equal.

9 Claims, 4 Drawing Figures

INVENTOR.
RICHARD H. VETTER
BY
ATTORNEYS.

FOCUSING ANAMORPHIC OPTICAL SYSTEM

CROSS-REFERENCE TO OTHER PATENT APPLICATION

This is a continuation of applicant's co-pending U.S. patent application, Ser. No. 798,924, filed Feb. 13, 1969, originally entitled "Anastigmatizer and Image Compression Stabilizer," the said original title having been amended to "Focusing Anamorphic Optical System," which patent application is now abandoned.

This invention relates to anamorphosing systems for use in photography and in projection.

Anamorphic photography and projection are widely used in making motion pictures for wide screens and curved screens, and in projecting the films on said screens. It is a property of anamorphosing systems that there is a compression ratio other than unity (usually greater) between the horizontal and the vertical. The result is, of course, a horizontal "squeeze." Anamorphosing lenses characteristically utilize at least two lens sections which are axially spaced apart, at least one, and usually both, including a cylindrical lens.

Anamorphosing lenses are optimally designed, and are anastigmatic, only for an object plane at infinity. For objects at infinity, these lenses work well, but of course there is no provision for effective story development with all action at a distance. Close-ups are important and necessary. For this reason, attempts have been made to focus systems which include anamorphic lenses. However, about the shortest object distance they could achieve was on the order of 4 feet, and this only by tolerating considerable image distortion, astigmatism, and change of compression ratio.

This invention can focus effectively as close as eight inches, and this without change in compression ratio and without astigmatism of such magnitude as to create a commercially objectionable image.

Some prior art efforts to achieve focusing have involved moving the sections of the anamorphosing lens relative to one another. The principal disadvantage to this method is that the aggregate power of the anamorphoser is changed, and therefore objects become wider and persons fatter in close-ups. This has led to the rejection of this technique in the marketplace. Also, because the anamorphosing lens is designed for focusing at infinity, its use at other object planes cannot help but compromise the image quality.

In the instant invention the anamorphosing lens is left alone. It operates at its design value — focused at infinity and no compromise with image quality is required.

Still another attempt to focus anamorphosing systems has been to place a collimating lens ahead of the anamorphosing lens. This method adds an intolerable weight and bulk to a system which, even without the collimating lens, is more than twice the bulk of a standard spherical focusing lens system. Furthermore, the collimating lens itself introduces problems of axial astigmatism and chromatic aberration.

In the instant invention, the anamorphic focusing lens is physically located within the envelope of the anamorphosing lens.

Yet another technique to avoid aberrations, especially astigmatism, while focusing the anamorphosing lens itself is the provision of a pair of rotatable, crossed cylindrical lenses whose relative position is correlated with that of the lenses which are shifted to accomplish the focus. This system has the disadvantage mentioned above of change in compression ratio during focusing, plus the need for a very exact relationship between the two cylindrical lenses themselves, and between them and the remainder of the system.

The instant invention does not require any rotation of a lens. Only a simple axial movement is needed, and it can readily be coordinated with a master focusing lens, if desired.

The anamorphosing focusable system of this invention has an optical axis and a film plane. A master focusing lens is axially shiftable along the optical axis to maintain a focused relationship between object and film plane. An anamorphosing lens has a pair of sections, and a compression ratio between the horizontal and vertical. An anamorphic focusing lens has a substantially equal ratio, and is axially shiftably disposed between the sections of the anamorphoser.

According to a preferred but optional feature of the invention, the motions of the master focusing lens and of the anamorphic focusing lens are interlinked and coordinated.

According to still preferred but optional feature of the invention, a spherical power compensation lens opposite in sign and with a power of value about equal to the mean between the horizontal and vertical powers of the anamorphic focusing lens is provided to maintain the field size relatively constant.

The above and other features of this invention will be fully understood from the following detailed description and the accompanying drawings, in which.

Figure 1:
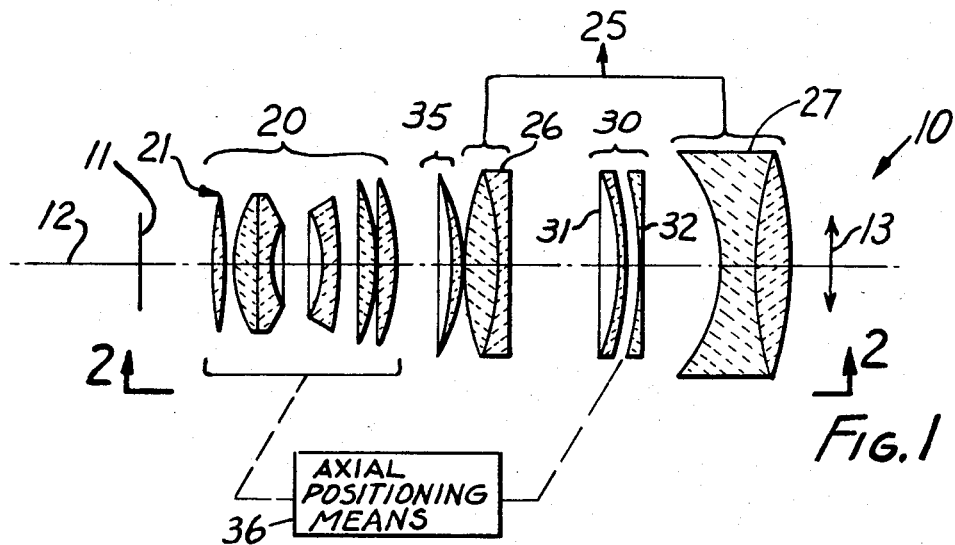
FIG. 1 is a top plan view of the presently preferred embodiment of the invention.

The anamorphosing system 10 of the invention is shown in FIG. 1. It has a film plane 11 and an optical axis 12. For convenience in description, the horizontal axis 13 is the plane of FIG. 1, and the vertical axis 14 is the plane of FIG. 2. It is the function of this system when used on photography to focus an object at any selected distance on the film plane, and when used as a projection lens to focus an image from the film plane onto a screen at some selected distance.

The system includes a master focusing lens 20 which may be of any conventional type utilized in motion picture photography, the position or identity of whose lens components 21 is of no importance to this invention. Customarily the focusing is accomplished by moving one or more, or even all, of the lens components along the axis so as to focus the image of an object onto the film plane.

In anamorphosing systems, an anamorphosing lens 25 is provided and these are generally well known in the art. They customarily include a first section 26 and a second section 27, at least one of which includes a cylindrical element. Often both do. In the embodiment shown, the first section 26 is a positive element and the second section is a negative element. These elements are customarily attached to a support casing (not shown) and the distance between them is fixed. This distance and the design of the lenses is such that the anamorphosing lens is focused at infinity and this is the condition of best operation of such lenses. As aforesaid, attempts have been made to change the focus of the anamorphosing lens by the simple expedient of moving one of the sections relative to the other, but this has introduced the change in compression ratio and aberrations heretofore discussed.

The particular compression ratio of the anamorphosing lens is of no importance to this invention. For the example given here, it will be assumed that 2:1 is the ratio between the horizontal compression and the vertical compression. There is no vertical compression, and the horizontal compression is 2. There are other commonly used systems in which the compression ratio is different, for example, 1.5:1.

Anamorphic focusing lens 30 is positioned between the sections 25. While it is referred to as but a single lens, it is evident that it may comprise more than one individual lens, if desired, and such will ordinarily be the case. However, this system will always include at least one cylindrical refracting surface and sometimes two of them. The instant example utilizes a cylindrical refracting surface and a spherical refracting surface. The important feature of this anamorphic focal lens is that it has a compression ratio substantially equal to that of the anamorphosing lens 25. This anamorphic focusing lens includes a first lens 31 and a second lens 32, the details of which will be more fully discussed later.

The term "compression ratio" is used herein to compare the power on the vertical and the power on the horizontal axis. For example, in a cylindrical lens having a power of −2.0 cylindrical diopters, the ratio would be 2:1, the compression on the horizontal axis being twice that on the vertical (cylindrical) axis, the latter being unity in this case.

As an optional feature, a power compensation lens 35 is provided adjacent to the first section on the opposite side thereof from the second section of the anamorphosing lens. The function of this power compensation lens is to restore the field's size which in the example was reduced. Alternatively, the relationship might be reversed, and lens 35 would then be made as a negative lens.

Axial positioning means 36 is schematically shown in FIG. 1. This constitutes an interlinkage between the master focusing lens and the anamorphic focusing lens whereby a change in axial position of one will work a corresponding change in the position of the other in order that the best focus with least aberration will result. A change in focus will result without any astigmatism whatever with the use of this device.

A useful arrangement with the system shown and a compression ratio of 2:1 is a first lens 31 which is spherical and has a power of −1.50 spherical diopters. Second lens 32 is a cylindrical lens with a power of −1.50 cylindrical diopters. The axis of the cylindrical lens is vertical, so that it has no power in the vertical axis. Its power is additive to that of lens 31 in the horizontal axis, the total of which is −3.0 diopters. Therefore the ratio between horizontal and vertical powers is −3.0:−1.5=2.0-1.0. It will be noted that this is the same ratio as that of the basic anamorphosing lens.

Now to maintain the approximate field size the power compensation lens 35 should be the mean value of the powers on the horizontal and vertical axis and of the opposite sign, namely $$-\left[\frac{-1.5+(-3.0)}{2}\right]=2.25 \text{ diopters.}$$

Such an arrangement has been found to be suitable for this system, and the positioning of the power compensation lens relative to the other elements of the system will be evident to persons skilled in the art.

Figure 2:
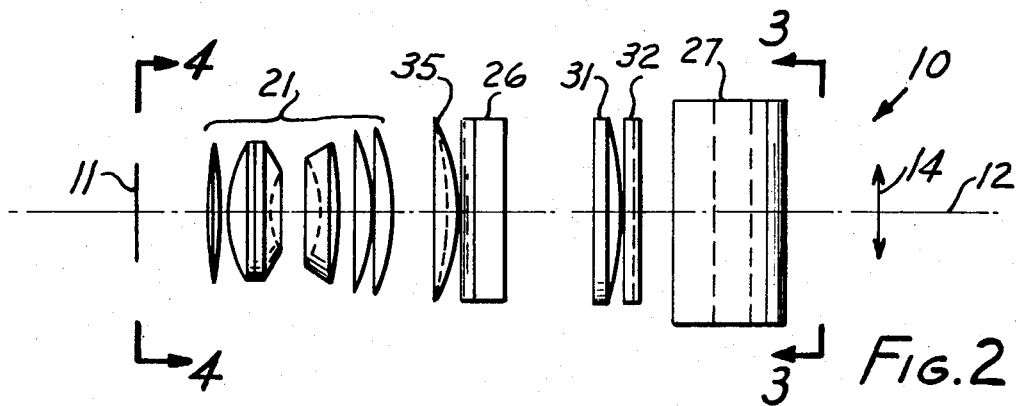
FIG. 2 is a side view of FIG. 1.
Figures 3, 4:
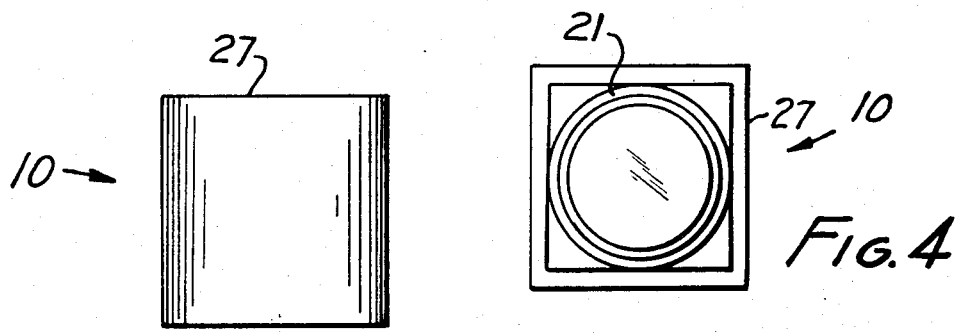
FIGS. 3 and 4 are right and left end views of FIG. 2, respectively.

In the example of FIGS. 1 and 2, when the focus is to be changed from infinity to a closer object distance, the master focusing lens as a body (or its components as appropriate) is moved axially away from the film plane in the conventional manner, and the anamorphic focusing lens 30 as a unit moves toward the film plane. Nothing else in the optical system changes its position, because all positions are fixed, and all of the motions are axial and not rotational.

Obviously substitutions of the above lenses can be made still remaining within the scope of the invention, and in fact the power compensation lens may be eliminated altogether. Other examples using a compression ratio of 2.0 are as follows:

| | | |
|---|---|---|
| a. | Lens 35: | −2.25 spherical diopters |
| | Lens 31: | +1.5 spherical diopters |
| | Lens 32: | +1.5 cylindrical diopters |
| b. | Lens 35: | −2.25 spherical diopters |
| | Lens 31: | +1.50 cylindrical diopters |
| | Lens 32: | +3.0 cylindrical diopters |

The axes of lenses 31 and 32 in this example are at right angles to each other.

As further examples the foregoing two arrangements may have their signs reversed from plus to minus or minus to plus as appropriate.

It will now be noted that in this device the compression ratio of the anamorphoser is never changed regardless of the change in focusing. Astigmatism is entirely eliminated as a result of focusing by the anamorphic focusing lens and if it is desired to keep the field size approximately constant, this can be accomplished with the power compensation lens. The precise placement of the lens can readily be derived from a simple test on an optical bench, and the selection of lenses may readily be calculated from the foregoing examples.

I claim:

1. An anamorphosing, focusable optical system for photography and projection having an optical axis, a film plane, and the following components: a master focusing lens axially shiftable along the optical axis to maintain a focused relationship between object and film plane; an anamorphosing lens comprising a pair of axially spaced-apart sections and having a ratio between the horizontal and the vertical power that is other than unity, an anamorphic focusing lens located between the said sections and axially shiftable along said optical axis, axial positioning means for shifting said master focusing lens and said anamorphic focusing lens, the anamorphic focusing lens having a ratio between its horizontal and vertical power that is substantially equal to the first-named ratio, the anamorphosing lens being on the opposite side of the master focusing lens from the film plane.

2. An optical system according to claim 1 in which a power compensation lens is located between the master focusing lens and the section of the anamorphosing lens closer to it so as substantially to maintain field size.

3. An optical system according to claim 2 in which the power of the power compensation lens is opposite in sign from and mean in value between the vertical and horizontal powers of the anamorphic focusing lens.

4. An optical system according to claim 1 in which the anamorphic focusing lens includes at least one cylindrical refracting surface.

5. An optical system according to claim 4 in which the anamorphic focusing lens further includes at least one spherical refracting surface.

6. An optical system according to claim 4 in which the anamorphic focusing lens includes a second cylindrical refracting surface whose axis is normal to that of the first cylindrical refracting surface, the axis of both of said first and second cylindrical refracting surfaces also being normal to the optical axis.

7. An optical system according to claim 4 in which the anamorphic focusing lens includes a second cylindrical refracting surface, the axis of both of said refracting surfaces being normal to said optical axis, whereby to produce in combination the said first-named ratio.

8. An optical system according to claim 7 in which the axes of said cylindrical refracting surfaces are non-parallel to each other.

9. The method of focusing an anamorphosing, optical system for photography and projection of the class which has an optical axis, a film plane, a master focusing lens axially shiftable along the optical axis to maintain a focused relationship between object and film plane, an anamorphosing lens comprising a pair of axially spaced-apart sections and having a ratio between the horizontal and vertical power that is other than unity, said sections being fixed relative to one another, comprising: placing on said optical axis, between said two sections, an anamorphic focusing lens having a ratio between its horizontal and vertical powers that is substantially equal to that of the anamorphosing lens, and, utilizing axial positioning means, shifting said master focusing lens and anamorphic focusing lens, causing a focus appropriate to the spacing apart of the system and the object.

* * * * *